(12) United States Patent
Jinno et al.

(10) Patent No.: US 8,719,484 B2
(45) Date of Patent: *May 6, 2014

(54) SYSTEM AND METHOD FOR USING A MULTIPATH

(71) Applicant: International Business Machines Corporation, Armonk, NY (US)

(72) Inventors: Mitsutoshi Jinno, Yamato (JP); Hiroyuki Miyoshi, Yamato (JP); Yoshihiko Terashita, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/829,636

(22) Filed: Mar. 14, 2013

(65) Prior Publication Data

US 2013/0205061 A1    Aug. 8, 2013

Related U.S. Application Data

(63) Continuation of application No. 13/248,913, filed on Sep. 29, 2011.

(30) Foreign Application Priority Data

Sep. 30, 2010 (JP) .................................. 2010-220333

(51) Int. Cl.
  *G06F 13/00* (2006.01)
  *G06F 15/16* (2006.01)
  *G06F 9/46* (2006.01)

(52) U.S. Cl.
  USPC ............................ 710/316; 709/236; 718/103

(58) Field of Classification Search
  USPC ............................ 710/316; 709/236; 718/103
  See application file for complete search history.

(56) References Cited

U.S. PATENT DOCUMENTS 7,373,436 B2   5/2008   Maeda et al.
7,376,726 B2   5/2008   Yamashita et al.
(Continued)

FOREIGN PATENT DOCUMENTS

JP   2008158666 A   7/2008
JP   2008250631 A   10/2008

OTHER PUBLICATIONS

U.S. Non-Final Office Action for U.S. Appl. No. 13/248,913 mailed Jun. 14, 2013.

(Continued)

*Primary Examiner* — Paul R Myers
*Assistant Examiner* — Christopher A Daley
(74) *Attorney, Agent, or Firm* — Kenneth L. Sherman, Esq.; Michael Zarrabian, Esq.; Sherman & Zarrabian LLP

(57) ABSTRACT

In a path determination unit of a SAS expander connected to a SAS initiator and connected via first and second paths to a SAS target, an SSP controller receives an SSP command frame received from the SAS initiator; a requested-data-length manager stores a requested data length of the SSP command frame in a requested-data-length storage unit; and a data-transfer-amount manager selects one of the first and second paths having a smaller one of the data transfer amounts stored in a data-transfer-amount storage unit, and adds the requested data length to the data transfer amount of the selected path. The SSP command frame is transmitted to the SAS target via the selected path. Upon receipt of an SSP response frame responding thereto, the requested data length is deleted from the requested-data-length storage unit, and the requested data length is subtracted from the data transfer amount of the selected path.

9 Claims, 14 Drawing Sheets

(56) References Cited

U.S. PATENT DOCUMENTS

| | | |
|---|---|---|
| 7,529,877 B2 | 5/2009 | Bashford et al. |
| 7,539,798 B2 | 5/2009 | Voorhees et al. |
| 7,761,642 B2 | 7/2010 | Stenfort |
| 7,913,023 B2 | 3/2011 | Johnson et al. |
| 7,953,917 B2 | 5/2011 | Seto |
| 7,996,707 B2 | 8/2011 | Coronado et al. |
| 8,352,699 B2 | 1/2013 | Tohana |
| 8,447,872 B2 | 5/2013 | Duerk et al. |
| 2010/0049691 A1 | 2/2010 | Ueda et al. |
| 2010/0229170 A1* | 9/2010 | Tohana ............... 718/1 |
| 2011/0231571 A1 | 9/2011 | Joshi et al. |

OTHER PUBLICATIONS

U.S. Notice of Allowance for U.S. Appl. No. 13/248,913 mailed Dec. 17, 2013.

* cited by examiner

|  | REAL TARGET PORT ADDRESS A | REAL TARGET PORT ADDRESS B | VIRTUAL TARGET PORT ADDRESS |
| --- | --- | --- | --- |
| #1 | D1A | D1B | D1 |
| #2 | D2A | D2B | D2 |
| #3 | D3A | D3B | D3 |

FIG. 3

| COMMAND IDENTIFIER | REQUESTED DATA LENGTH | PATH IDENTIFIER |
|---|---|---|
| cmd1 | L1 | pass1 |
| cmd2 | L2 | pass2 |
| cmd3 | L3 | pass1 |
| cmd4 | L4 | pass2 |
| ⋮ | ⋮ | ⋮ |

FIG. 8

| PATH IDENTIFIER | DATA TRANSFER AMOUNT |
|---|---|
| pass1 | T1 |
| pass2 | T2 |

FIG. 9

SYSTEM AND METHOD FOR USING A MULTIPATH

CROSS-REFERENCE TO RELATED APPLICATIONS

This patent application is a continuation patent application of U.S. patent application Ser. No. 13/248,913 filed on Sep. 29, 2011, which claims priority to Japanese Patent Application Serial No. 2010-220333 filed Sep. 30, 2010, the disclosure of which are both incorporated herein its entirety by reference.

BACKGROUND

The present invention relates to a system and a method for using a multipath. The present invention particularly relates to a system and a method for using a multipath in a Serial Attached SCSI (SAS) network.

Many storage networks have a multipath configuration which is a redundant configuration having duplicated paths from a host to storages. For example, in a multipath configuration in a SAS storage network, a host has two SAS initiator ports, a storage has two SAS target ports, and two redundant SAS links from the two SAS target ports of the storage are connected to the SAS initiator ports of the host, respectively. The multipath configuration allows each of the SAS initiator ports to access only a corresponding one of the SAS target ports. Even though a failure occurs on one path, this multipath configuration enables the host to access the storage through the other path. Thus, this is a necessary configuration to enhance the reliability of the storage.

However, the building-up of such a multipath configuration alone makes the host see a single storage as different storages. In addition, when a failure occurs on one path, the configuration does not allow automatic switch-over to the other path.

To cope with the problems, software for controlling the multipath (hereinafter, referred to as a "multipath driver") is generally installed on the host. The multipath driver controls the number of storages seen from the host, detects a failure on a path, and performs switch-over between paths at the time of the failure on the path. In other words, the multipath driver makes the multipath transparent to applications of the host.

Meanwhile, techniques related to the redundant configuration in a storage network have been known conventionally (for example, see Japanese Patent Application Publication Nos. 2008-158666 and 2008-250631).

In Japanese Patent Application Publication No. 2008-158666, in a storage-device multipath system in which a host computer is connected to each storage device through multiple access paths, the host computer detects all the access paths, monitors a failure occurrence status of each of the detected access paths by issuing a check I/O to the access path at regular time intervals, and generates failure point information based on the failure occurrence statuses of the access paths, the failure point information collectively showing components each supposed to have a failure.

Japanese Patent Application Publication No. 2008-250631 describes a disk array subsystem having a network that connects multiple storage apparatuses. The disk array subsystem also includes a data input/output unit configured to input and output data from and to the network, and connecting units configured to connect the data input/output unit and each of the storage apparatuses. In the disk array subsystem, multiple physical links are established to exchange data between the data input/output unit and the connecting units and between the connecting units. Among these paths, at least one physical link is zoned into at least one or more logical links to establish multiple logical links in the one physical link. The data is transferred simultaneously in a multiplexed manner through the multiple logical links while the data is transferred through the physical link.

As described above, when a multipath configuration is built up in a storage network, a multipath driver is installed on a host in general.

However, it is necessary at present to install different multipath drivers depending on interfaces used in the storage network. Furthermore, even if a common interface is used in the entire storage network, it is necessary to install different multipath drivers on hosts in a case where the hosts have different OSs, a case where storage products or switching products of different vendors are connected to the hosts, or any similar cases. For this reason, introduction of a multipath configuration is troublesome, and further some combination of multipath drivers might cause an unexpected operation. Thus, careful combination verifications need to be performed prior to the start of the system operation.

One of conceivable methods for solving such problems is a method in which SAS expanders implement multipath control of multiple SAS paths provided between the host and storages via the SAS expanders. This method normally involves exclusive path control, but it is preferable to distribute the load on SAS traffic to the paths.

Note that the techniques in Japanese Patent Application Publication Nos. 2008-158666 and 2008-250631 are techniques related to the redundant configuration in the storage network, but are neither for solving the above problems with installation of the multipath driver on the host, nor for distributing load by using the multipath under the multipath control implemented by the SAS expanders.

BRIEF SUMMARY

An object of the present invention is to enable load distribution using a multipath in a SAS network.

Another object of the present invention is to enable the load distribution using the multipath in the SAS network without having to install a multipath driver on a host.

To achieve the aforementioned objects, the present invention provides a system using a multipath in a SAS network, comprising: a SAS initiator; a SAS target including a first port and a second port; and a SAS expander connected to the SAS initiator and configured to form a first path by connecting with the first port, and to form a second path by connecting with the second port, wherein the SAS expander includes: a storage unit configured to store, for each of the first path and the second path, a transmitted-received data amount that is an amount of data transmitted and received through the path; a receiving unit configured to receive a Serial SCSI Protocol (SSP) command frame from the SAS initiator, and to receive an SSP response frame from the SAS target; a determination unit configured to, in a case where the receiving unit receives the SSP command frame, determine which one of the first and second paths to use as a particular path to transmit the SSP command frame to the SAS target, on the basis of the transmitted-received data amounts stored in the storage unit; an adding unit configured to add a requested data amount to the transmitted-received data amount for the particular path stored in the storage unit, the requested data amount being an amount of data requested to be transmitted and received by the SSP command frame received by the receiving unit; a subtracting unit configured to, in a case where the receiving unit receives the SSP response frame responding to the SSP command frame, subtract the requested data amount from the transmitted-received data amount for the particular path stored in the storage unit; and a transmitting unit configured to transmit the SSP command frame received by the receiving unit to the SAS target through the particular path, and to transmit the SSP response frame received by the receiving unit to the SAS initiator.

In the system, the SAS expander may further include a holding unit configured to hold information indicating that the SSP command frame is received by the receiving unit; the holding unit may delete the information indicating that the SSP command frame is received, if the information is still held even after the elapse of a predetermined time from the start of holding the information; and the subtracting unit may subtract the requested data amount from the transmitted-received data amount for the particular path stored in the storage unit, if the information indicating that the SSP command frame is received is still held even after the elapse of the predetermined time from the start of holding of the information.

Alternatively, in a case where the receiving unit receives the SSP response frame responding to the SSP task frame, the subtracting unit may subtract an amount of data requested to be transmitted and received by at least one SSP command frame targeted by the SSP task frame, from the transmitted-received data amount for the particular path stored in the storage unit.

Furthermore, the present invention provides a system using a multipath in a SAS network, comprising: a SAS initiator; a SAS target including a first port and a second port; a first SAS expander connected to the SAS initiator and configured to form a first path from the first SAS expander itself to the SAS target by connecting with the first port; and a second SAS expander connected to the SAS initiator and configured to form a first path from the second SAS expander itself to the SAS target by connecting with the second port, wherein the first SAS expander forms a second path from the first SAS expander itself to the SAS target by connecting with the second port via the second SAS expander, the second SAS expander forms a second path from the second SAS expander itself to the SAS target by connecting with the first port via the first SAS expander, and each of the first SAS expander and the second SAS expander includes: a storage unit configured to store, for each of the first path and the second path from the SAS expander itself to the SAS target, a transmitted-received data amount that is an amount of data transmitted and received through the path; a receiving unit configured to receive an SSP command frame from the SAS initiator, and to receive an SSP response frame from the SAS target; a determination unit configured to, in a case where the receiving unit receives the SSP command frame, determine which one of the first and second paths from the SAS expander itself to the SAS target to use as a particular path to transmit the SSP command frame to the SAS target, on the basis of the transmitted-received data amounts stored in the storage unit; an adding unit configured to add a requested data amount to the transmitted-received data amount for the particular path stored in the storage unit, the requested data amount being an amount of data requested to be transmitted and received by the SSP command frame received by the receiving unit; a subtracting unit configured to, in a case where the receiving unit receives the SSP response frame responding to the SSP command frame, subtract the requested data amount from the transmitted-received data amount for the particular path stored in the storage unit; and a transmitting unit configured to transmit the SSP command frame received by the receiving unit to the SAS target through the particular path, and to transmit the SSP response frame received by the receiving unit to the SAS initiator.

In the system, the first SAS expander may notify the SAS initiator of a virtual expander address that is a single virtual SAS address shared by the first SAS expander itself and the second SAS expander, instead of a SAS address of the first SAS expander itself, and notify the SAS initiator of a virtual target port address that is a SAS address of a single virtual port of the SAS target, instead of SAS addresses of the first port and the second port; the second SAS expander may notify the SAS initiator of the virtual expander address instead of a SAS address of the second SAS expander itself and notify the SAS initiator of the virtual target port address instead of the SAS addresses of the first port and the second port; and the SAS initiator may recognize that a single SAS expander is connected to a single wide port of the SAS initiator itself when being notified of the virtual expander address by the first SAS expander and the second SAS expander, and recognize that the SAS target is connected to the single SAS expander via a single port when being notified of the virtual target port address by the first SAS expander and the second SAS expander.

Moreover, the present invention provides a device functioning as a SAS expander configured to connect a SAS initiator and a SAS target, the device comprising: a storage unit configured to store, for each of a plurality of paths to the SAS target, a transmitted-received data amount that is an amount of data transmitted and received through the path; a receiving unit configured to receive an SSP command frame from the SAS initiator, and to receive an SSP response frame from the SAS target; a determination unit configured to, in a case where the receiving unit receives the SSP command frame, determine which one of the plurality of paths to use as a particular path to transmit the SSP command frame to the SAS target, on the basis of the transmitted-received data amounts stored in the storage unit; an adding unit configured to add a requested data amount to the transmitted-received data amount for the particular path stored in the storage unit, the requested data amount being an amount of data requested to be transmitted and received by the SSP command frame received by the receiving unit; a subtracting unit configured to, in a case where the receiving unit receives the SSP response frame responding to the SSP command frame, subtract the requested data amount from the transmitted-received data amount for the particular path stored in the storage unit; and a transmitting unit configured to transmit the SSP command frame received by the receiving unit to the SAS target through the particular path, and to transmit the SSP response frame received by the receiving unit to the SAS initiator.

Further, the present invention provides a method for using a multipath in a device functioning as a SAS expander configured to connect a SAS initiator and a SAS target, wherein a storage unit is provided to store, for each of a plurality of paths to the SAS target, a transmitted-received data amount that is an amount of data transmitted and received through the path, the method comprising the steps of: receiving an SSP command frame from the SAS initiator; upon receipt of the SSP command frame, determining which one of the plurality of paths to use as a particular path to transmit the SSP command frame to the SAS target, on the basis of the transmitted-received data amounts stored in the storage unit; adding a requested data amount to the transmitted-received data amount for the particular path stored in the storage unit, the requested data amount being an amount of data requested to be transmitted and received by the SSP command frame; transmitting the SSP command frame to the SAS target through the particular path; receiving an SSP response frame responding to the SSP command frame, from the SAS target; upon receipt of the SSP response frame, subtracting the requested data amount from the transmitted-received data amount for the particular path stored in the storage unit; and transmitting the SSP response frame to the SAS initiator.

Furthermore, the present invention provides a program causing a computer to function as a SAS expander configured to connect a SAS initiator and a SAS target, the program causing the computer to function as: a storage unit configured to store, for each of a plurality of paths to the SAS target, a transmitted-received data amount that is an amount of data transmitted and received through the path; a receiving unit configured to receive an SSP command frame from the SAS initiator, and to receive an SSP response frame from the SAS target; a determination unit configured to, in a case where the receiving unit receives the SSP command frame, determine which one of the plurality of paths to use as a particular path to transmit the SSP command frame to the SAS target, on the basis of the transmitted-received data amounts stored in the storage unit; an adding unit configured to add a requested data amount to the transmitted-received data amount for the particular path stored in the storage unit, the requested data amount being an amount of data requested to be transmitted and received by the SSP command frame received by the receiving unit; a subtracting unit configured to, in a case where the receiving unit receives the SSP response frame responding to the SSP command frame, subtract the requested data amount from the transmitted-received data amount for the particular path stored in the storage unit; and a transmitting unit configured to transmit the SSP command frame received by the receiving unit to the SAS target through the particular path, and to transmit the SSP response frame received by the receiving unit to the SAS initiator.

BRIEF DESCRIPTION OF THE SEVERAL VIEWS OF THE DRAWINGS

FIG. 3 an example of a target-port configuration table used in the embodiment of the present invention;

FIG. 5-1 is a flowchart showing an example of an operation of the SAS expander in the embodiment of the present invention at the time of generating virtual topology;

FIG. 5-2 is a flowchart showing an example of an operation of the SAS expander in the embodiment of the present invention at the time of reporting virtual topology;

FIG. 8 is a diagram showing an example of a requested-data-length table used in the embodiment of the present invention;

FIG. 9 is a diagram showing an example of data-transfer-amount counters used in the embodiment of the present invention;

DETAILED DESCRIPTION

Hereinbelow, a description is given in detail of an embodiment of the present invention with reference to the attached drawings.

Firstly, an overview is given of the embodiment of the present invention.

A SAS storage network includes multiple SAS devices (a SAS initiator and SAS targets) connected together by using SAS expanders.

In this embodiment, characteristics of the SAS are utilized in such a SAS storage network without departing from the SAS standards, and thereby a multipath control function is installed on the SAS expanders used for configuring a multipath. Specifically, among the SAS characteristics, an attention is paid to multilane connection and a SAS topology discovery process using a SAS management protocol (SMP), so that a function of reporting a host-specific virtual SAS topology to each of the hosts and a function of converting a SAS address are added to the SAS expanders.

This makes it possible to make the host believe as if a single highly reliable SAS storage device were connected to the host through a multilane port, without the need for a special host bus adapter (HBA) or a storage device and for installation of special software such as a multipath driver on the host.

Figure 1:
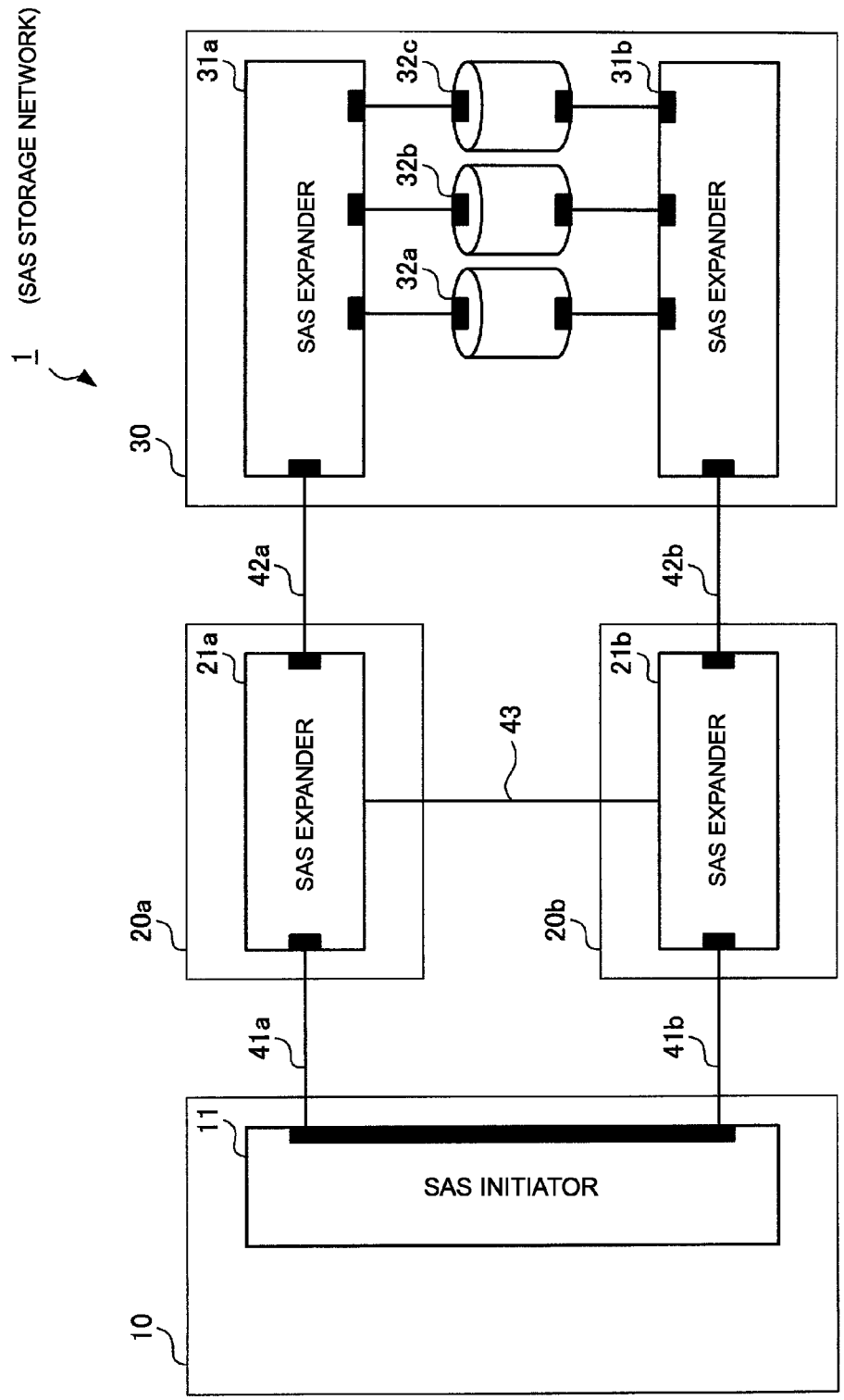
FIG. 1 is a block diagram showing a configuration example of a SAS storage network in an embodiment of the present invention.

FIG. 1 is a block diagram showing a configuration example of a SAS storage network 1 in the embodiment of the present invention.

As illustrated therein, the SAS storage network 1 in this embodiment includes a SAS host 10, SAS switches 20a, 20b, and a SAS storage subsystem 30.

The SAS host 10 is a computer that accesses the SAS storage subsystem 30 via the SAS switches 20a, 20b and might be simply referred to as a "host." For example, if the SAS storage network 1 is a blade server system, the SAS host 10 is a blade server accommodating components such as a microprocessor, a memory, and a network controller therein all together.

The SAS host 10 includes a unit that serves as a SAS initiator 11. Specifically, the unit that serves as the SAS initiator 11 is an HBA, for example.

Further, in this embodiment, the SAS initiator 11 is configured to include a wide port as a single SAS initiator port (hereinafter, simply referred to as an "initiator port") as will be described later, the wide port being shown by a portion filled in black in the SAS initiator 11. Redundant links 41a, 41b from SAS switches 20a, 20b, respectively, are put together as a multilane and connected to the wide port. This means that the wide port is assigned a single SAS address. Hereinafter, H is given as the SAS address. Note that since a wide port function using a multilane is supported in a SAS as a standard function, such a configuration can be provided without the need for special software.

The SAS switches 20a, 20b are switch modules that form respective multiple paths by connecting the SAS host 10 and the SAS storage subsystem 30 together.

The SAS switches 20a, 20b include units serving as the SAS expanders 21a, 21b, respectively. In this embodiment, the SAS expander 21a is provided as an example of a first SAS expander, and the SAS expander 21b is provided as a second SAS expander.

Further, from the SAS storage subsystem 30, the link 42a is connected to the SAS expander 21a, and the link 42b is connected to the SAS expander 21b. In addition, the SAS expanders 21a, 21b are also connected to each other, thus forming a bridge 43.

Meanwhile, FIG. 1 shows each of the SAS expanders 21a, 21b. If discrimination thereof from each other is not required, each of the SAS expanders 21a, 21b is also referred to as a SAS expander 21 simply. In addition, the two SAS expanders 21 are shown herein, but the number of the SAS expanders 21 is not limited to two.

The SAS storage subsystem 30 is a subsystem that stores data received from the SAS host 10 and transmits the stored data to the SAS host 10.

The SAS storage subsystem 30 includes units that function as SAS expanders 31a, 31b and units that function as SAS targets 32a, 32b, 32c. Specifically, the units that serve as the SAS expanders 31a, 31b are, for example, SAS storage controllers that control SAS storage devices. Each of the units that serve as the SAS targets 32a, 32b, 32c is, for example, a SAS storage device having dual ports and has two SAS target ports (hereinafter, each simply referred to as a "target port"). Each of the two target ports has a SAS address. Hereinafter, concerning the SAS addresses of the two target ports of each of the SAS targets 32a, 32b, 32c, target ports on the SAS expander 31a side have SAS addresses of D1A, D2A, and D3A, respectively, while target ports on the SAS expander 31b have SAS addresses of D1B, D2B, and D3B. In this embodiment, each target port on the SAS expander 31a side is used as an example of a first port, and each target port on the SAS expander 31b side is used as a second port.

Meanwhile, FIG. 1 shows each of the SAS targets 32a, 32b, 32c. If discrimination thereof from each other is not required, each of the SAS targets 32a, 32b, 32c is also referred to as a SAS target 32 simply. In addition, the three SAS targets 32 are shown herein, but the number of the SAS targets 32 is not limited to three.

In such a configuration, there are the following four physical paths (x=1, 2, 3) from the SAS host 10 to the SAS target 32.
(A) Initiator port H→link 41a→link 42a→target port DxA
(B) Initiator port H→link 41a→bridge 43→link 42b→target port DxB
(C) Initiator port H→link 41b→link 42b→target port DxB
(D) Initiator port H→link 41b→bridge 43→link 42a→target port DxA Meanwhile, special software such as a multipath driver is not installed on the SAS host 10 in this embodiment, as described above.

However, if the multipath driver or the like is not installed on the SAS host 10 without any modification of the configuration shown in FIG. 1, the SAS host 10 sees the SAS target 32 as multiple SAS targets 32, because the SAS host 10 can access each of the two target ports of the SAS target 32 through different paths.

Hence, in order to control the number of the SAS targets 32 seen from the SAS host 10 and control the access paths to the SAS targets 32, the following functions are provided to the SAS expanders 21a, 21b directly connected to the SAS host 10:
(1) Target-port configuration table;
(2) Reporting a host-specific virtual SAS topology to each corresponding one of the hosts; and
(3) Controlling a path by converting a SAS address of a target port.

Next, a description is given of a functional configuration of the SAS expander 21 provided with the functions. Note that the same functional configuration is provided to the SAS expanders 21a, 21b, and thus the description is herein given by taking the functional configuration thereof as a functional configuration of the SAS expander 21.

Figure 2:
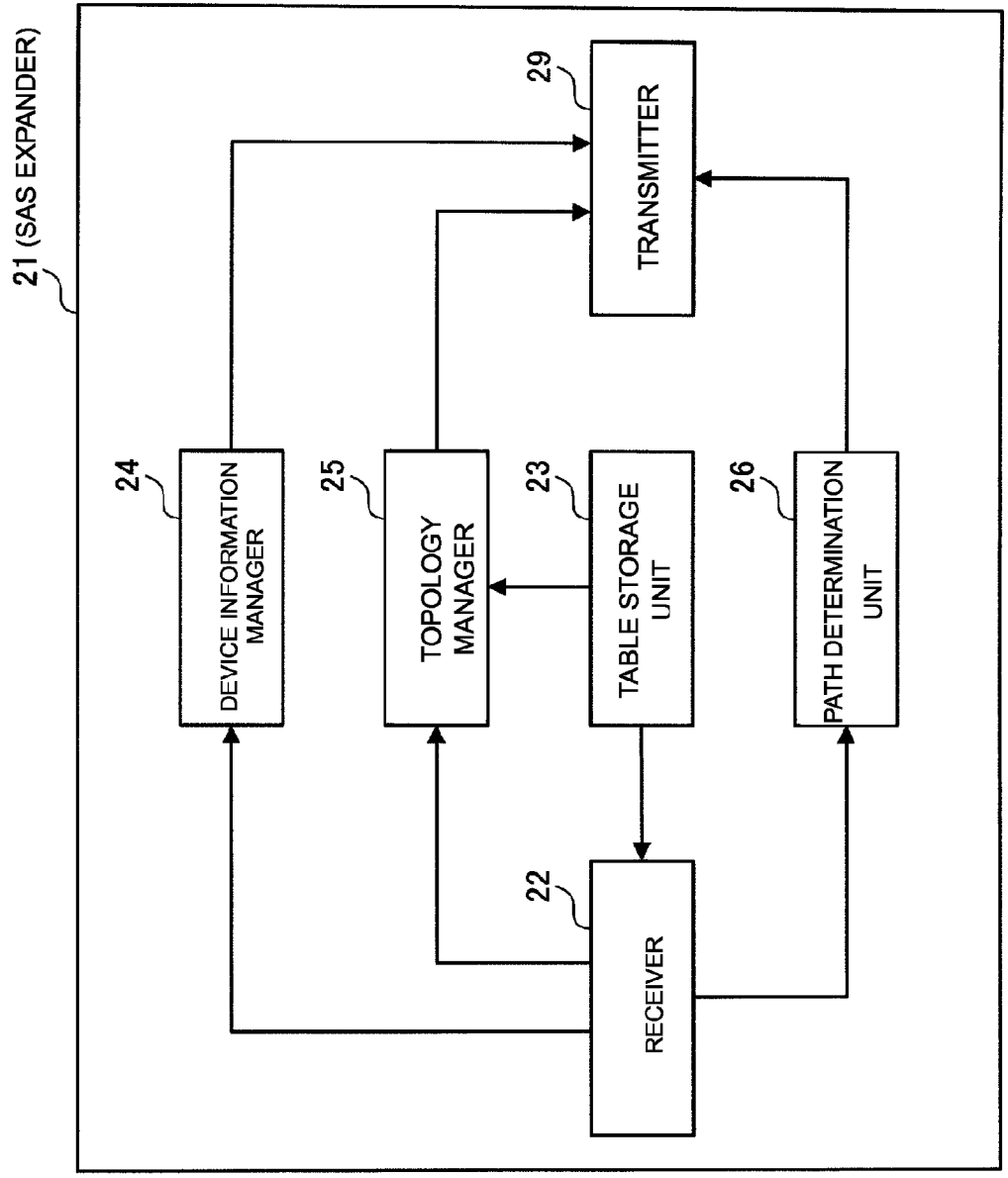
FIG. 2 is a block diagram showing a functional configuration example of a SAS expander in the embodiment of the present invention.

FIG. 2 is a block diagram showing a functional configuration example of the SAS expander 21 in the embodiment of the present invention.

As illustrated therein, the SAS expander 21 includes a receiver 22, a table storage unit 23, a device information manager 24, a topology manager 25, a path determination unit 26, and a transmitter 29.

The receiver 22 receives an Identify Address frame transmitted at the time of initialization by the SAS initiator 11. The receiver 22 also receives: a SAS topology request transmitted by the SAS initiator 11 at the time of execution of a SAS discovery process; and a reply in response to a SAS topology request transmitted at the time of execution of the SAS discovery process by the device itself which is a corresponding one of the SAS switches 20a, 20b. Further, the receiver 22 receives a SAS frame transmitted by the SAS initiator 11.

The table storage unit 23 stores a target-port configuration table to be referred to when a SAS address (hereinafter, referred to as a "real target port address") of an actual target port of each SAS target 32 is converted into a SAS address (hereinafter, referred to as a "virtual target port address") of a virtual target port of the SAS target 32, or when the virtual target port address of the SAS target 32 is converted into the real target port address of the SAS target 32. The target-port configuration table will be described in detail later.

The device information manager 24 manages device information indicating that the device type of the device itself is a SAS expander and including the virtual SAS address thereof (hereinafter, referred to as a "virtual expander address").

The topology manager 25 manages information for executing a process for knowing SAS topology (SAS discovery process) by the device itself and generates virtual SAS topology (hereinafter, referred to as "virtual topology") based on SAS topology acquired by executing the SAS discovery process by the device itself. The virtual topology in particular includes the virtual target port addresses of the SAS targets 32.

The destination address determination unit 26 receives the SAS frame from the receiver 22, analyzes data of a frame of a SSP transport layer thereof, and determines a path to be used for routing the SAS frame among multiple paths so that the traffic the SAS can be distributed evenly as much as possible. Then, the path determination unit 26 hands over the SAS frame and information on the determined path to the transmitter 29.

When receiving an Identify Address frame from the SAS initiator 11, the transmitter 29 transmits to the SAS initiator 11 information indicating that the device type of the device itself is a SAS expander and including a virtual expander address thereof. When detecting a link reset or receiving a change broadcast, the transmitter 29 transmits a SAS topology request to the other devices. The transmitter 29 then transmits virtual topology in response to the SAS topology request from the SAS initiator 11. Further, the transmitter 29 transmits the SAS frame to the SAS target 32.

Hereinafter, a description is given of the functions (1) to (3) provided to the SAS expander 21.

(1) Target-Port Configuration Table

FIG. 3 shows an example of the target-port configuration table stored in the table storage unit 23 of the SAS expander 21.

As illustrated therein, the target-port configuration table has as many entries as the storages provided to the SAS host 10. Since the SAS targets 32a, 32b, 32c are shown in FIG. 1, entries #1, #2, and #3 corresponding to the respective SAS targets 32 are provided in FIG. 3.

In the target-port configuration table, a value is set for each of the following items in each entry.

The first item is a real target port (represented by a real target port A in FIG. 3) on the SAS expander 31a side of the corresponding SAS target 32. Here, according to the description with FIG. 1, the SAS addresses of D1A, D2A, and D3A are stored in the entries #1, #2, and #3, respectively.

The second item is a real target port (represented by a real target port B in FIG. 3) on the SAS expander 31b side of the corresponding SAS target 32. Here, according to the description with FIG. 1, the SAS addresses of D1B, D2B, and D3B are stored in the entries #1, #2, and #3, respectively.

The third item is a virtual target port address of the SAS target 32. Here, D1 is set as a virtual target port address for D1A and D1B; D2, for D2A and D2B; and D3, for D3A and D3B.

It is recommended that the target-port configuration table be transmitted to the SAS expander 21 by using the SMP by the SAS host 10 or another server for SAS management. Alternatively, the target-port configuration table may be set by using a management user interface such as a web interface through a communication line.

As the virtual target port address to be set in the target-port configuration table, a new SAS address may be generated, as shown in FIG. 3, or if a virtual SAS address (a SAS device name or the like, for example) has already been provided to the SAS target 32, the virtual SAS address may be used.

Note that the target-port configuration table needs to be provided to each of the SAS expanders 21a, 21b. Moreover, it is necessary to synchronize the target-port configuration tables of the respective SAS expanders 21a, 21b.

(2) Reporting Host-Specific Virtual SAS Topology to Host

The SAS initiator 11 identifies a connection destination for the initiator ports thereof at the time of initialization of the SAS ports. Specifically, by using the Identify Address frame, the SAS initiator 11 identifies the device type and the SAS address of the devices connected to the PHYs of the SAS initiator 11. In this embodiment, the SAS initiator 11 transmits the Identify Address frame to each of the SAS expanders 21a, 21b.

In response to this, the SAS expanders 21 notify the SAS initiator 11 of the same virtual expander address instead of their real SAS addresses.

Figure 4:
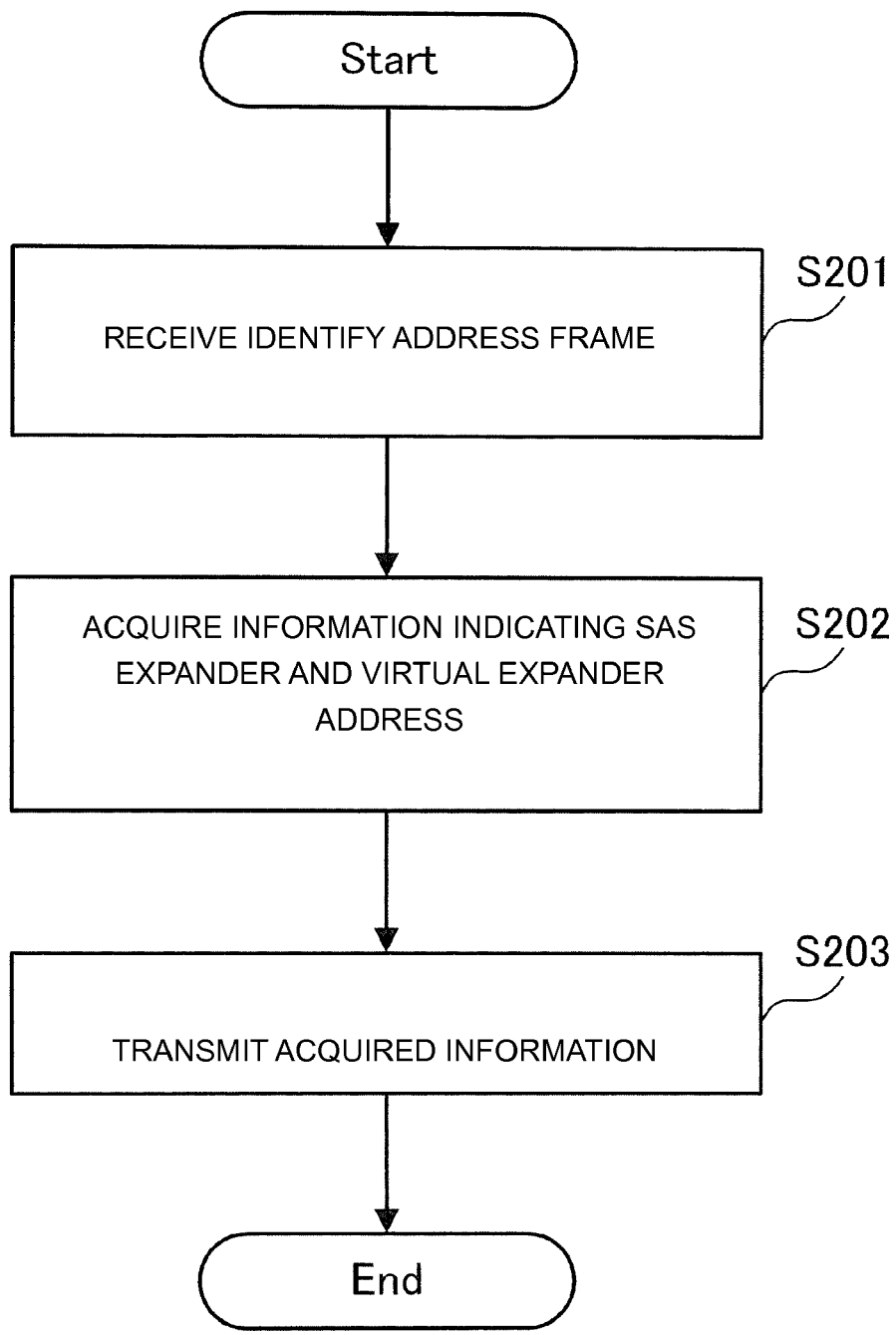
FIG. 4 is a flowchart showing an example of an operation of the SAS expander in the embodiment of the present invention at the time of reporting virtual topology.

FIG. 4 is a flowchart showing an example of an operation of the SAS expanders 21 at this time.

In each of the SAS expanders 21 (SAS expanders 21a, 21b), the receiver 22 firstly receives an Identify Address frame from the SAS initiator 11 (Step 201).

Then, the device information manager 24 acquires information indicating that the device type of the SAS expander 21 itself is a SAS expander and a virtual expander address as a SAS address owned in common by the SAS expanders 21a, 21b (Step 202). Note that the virtual expander address may be stored in advance in an unillustrated memory in the SAS expander 21.

Subsequently, the transmitter 29 transmits the device type and the SAS address acquired by the device information manager 24 to the SAS initiator 11 (Step 203).

As the result, an HBA of the SAS host 10 judges that two PHYs thereof are connected to the same SAS expander and thus configures a single two-lane port. This is because, when multiple PHYs are connected to the same SAS expander, the HBA forms a wide port and causes the multiple PHYs to function as a single port.

Thereafter, the SAS initiator 11 executes the process for knowing SAS topology (SAS discovery process). A device having executed the SAS discovery process can know a device type, a SAS address, a supported protocol, and a SAS expander connected thereto of each device existing in the SAS domain. The SAS initiator 11 executes and utilizes the discovery process to identify a connectable SAS address and a connection rate.

Note that the SAS expander 21 generally needs to build up a routing table for routing a SAS frame. As the method for building up the routing table for itself, the following two methods are provided: 1) self configuration in which a routing table is built up by the SAS expander 21 by executing the SAS discovery process and acquiring information; and 2) external configuration in which a routing table is set up in the SAS expander 21 by an external device (the SAS initiator 11, for example) by using the SMP.

In this embodiment, only the self configuration of the two above is supported. In other words, the SAS expander 21 also executes the SAS discovery process for building up its own routing table.

Meanwhile, as described above, the SAS initiator 11 executes the SAS discovery process and thereby requests the SAS expander 21 for SAS topology.

In response to this, the SAS expander 21 notifies the SAS initiator 11 of virtual SAS topology (virtual topology) including the single virtual target port address instead of the actual SAS topology including real SAS addresses of the target ports of the SAS target 32.

Figures 1, 5:
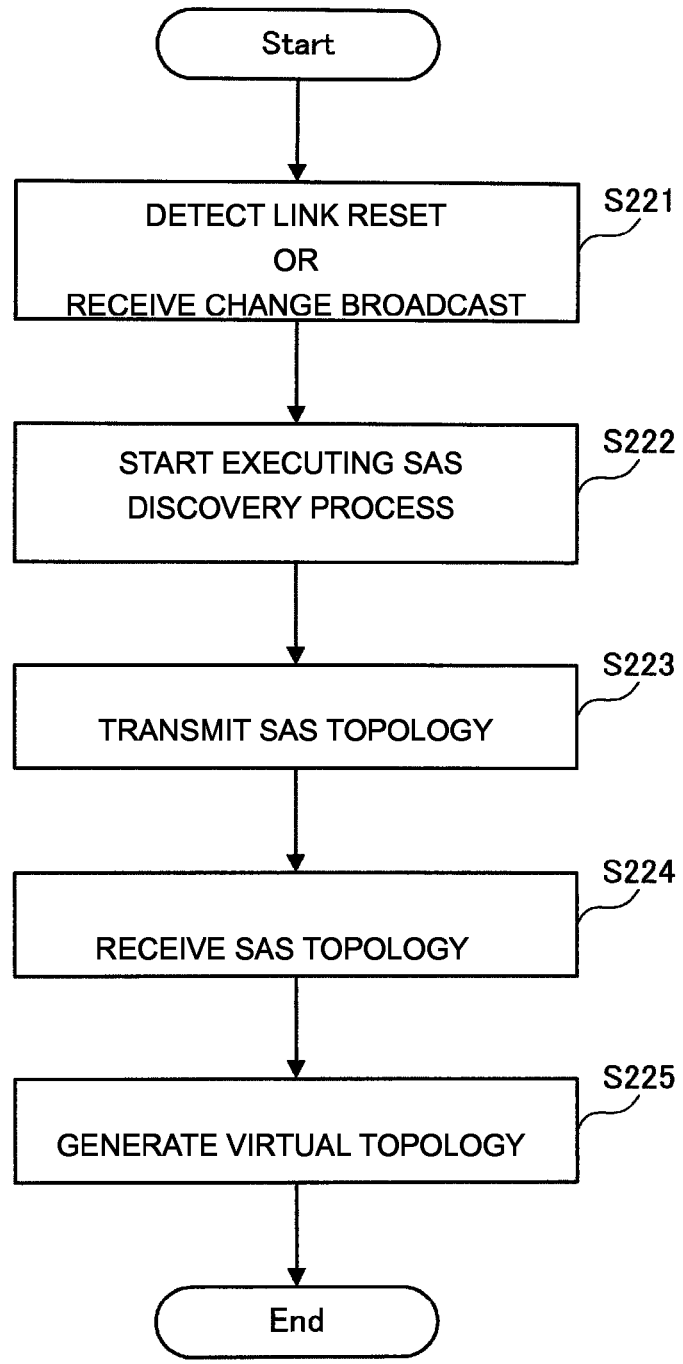
Figures 2, 5:
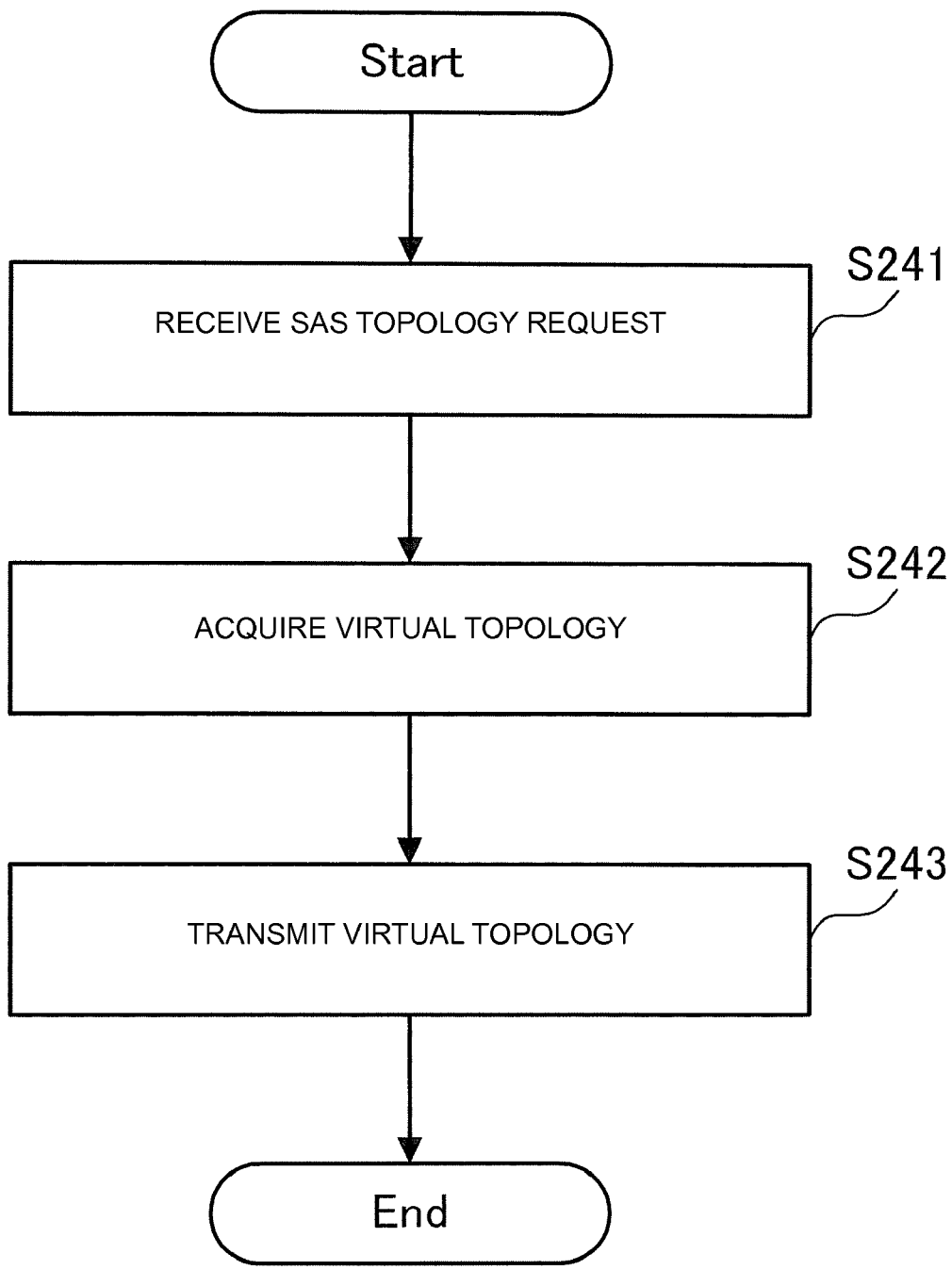

FIGS. 5-1 and 5-2 are flowcharts showing examples of operations of the SAS expander 21 at this time. FIG. 5-1 shows the operation example in the case where the SAS expander 21 executes the SAS discovery process, while FIG. 5-2 shows the operation example in the case where the SAS initiator 11 executes the SAS discovery process.

First, a description is given of the case where the SAS expander 21 executes the SAS discovery process.

As shown in FIG. 5-1, in the SAS expander 21, the receiver 22 firstly detects a link reset or receives a change broadcast (Step 221).

Then, the topology manager 25 starts executing the SAS discovery process for knowing the SAS topology (Step 222).

Subsequently, the transmitter 29 requests the other devices for SAS topology (Step 223). Specifically, the transmitter 29 first requests any device connected with the PHY thereof for the SAS topology. If the device connected therewith is further a SAS expander, the same processing is performed for the further connected SAS expander.

Thereby, the receiver 22 receives SAS topology showing the device type, the SAS address, the supported protocol, and the SAS expander connected thereto for each device existing in the SAS domain (Step 224).

Then, the topology manager 25 generates virtual topology based on the SAS topology received by the receiver 22 (Step 225). Note that virtual topology is for making the SAS host 10 believe as if only devices accessible by the HBA were directly connected to SAS expanders. This means that the processing of generating the virtual topology includes: processing of converting an address of a real target port into a virtual target port address by referring to the target-port configuration table; processing of converting actual topology into one showing a state in which a SAS expander having a virtual expander address is connected to a virtual target port having the virtual target port address; and the like. Meanwhile, if the SAS topology received by the receiver 22 is inconsistent with the definition in the target-port configuration table, the topology manager 25 may generate error information. The virtual topology and error information may be stored in the unillustrated memory in the SAS expander 21.

Next, a description is given of the case where the SAS initiator 11 executes the SAS discovery process.

The SAS initiator 11 executes the SAS discovery process in response to a detection of a link reset or a change broadcast. In other words, the SAS initiator 11 requests the SAS expander 21 for the SAS topology.

Thereby, as shown in FIG. 5-2, the receiver 22 in the SAS expander 21 firstly receives the SAS topology request from the SAS initiator 11 (Step 241).

Then, the topology manager 25 extracts the virtual topology stored in the unillustrated memory (Step 242).

Subsequently, the transmitter 29 transmits the extracted virtual topology to the SAS initiator 11 (Step 243). If error information is stored in the unillustrated memory, the transmitter 29 may transmit an error message to the SAS initiator 11.

Figure 6:
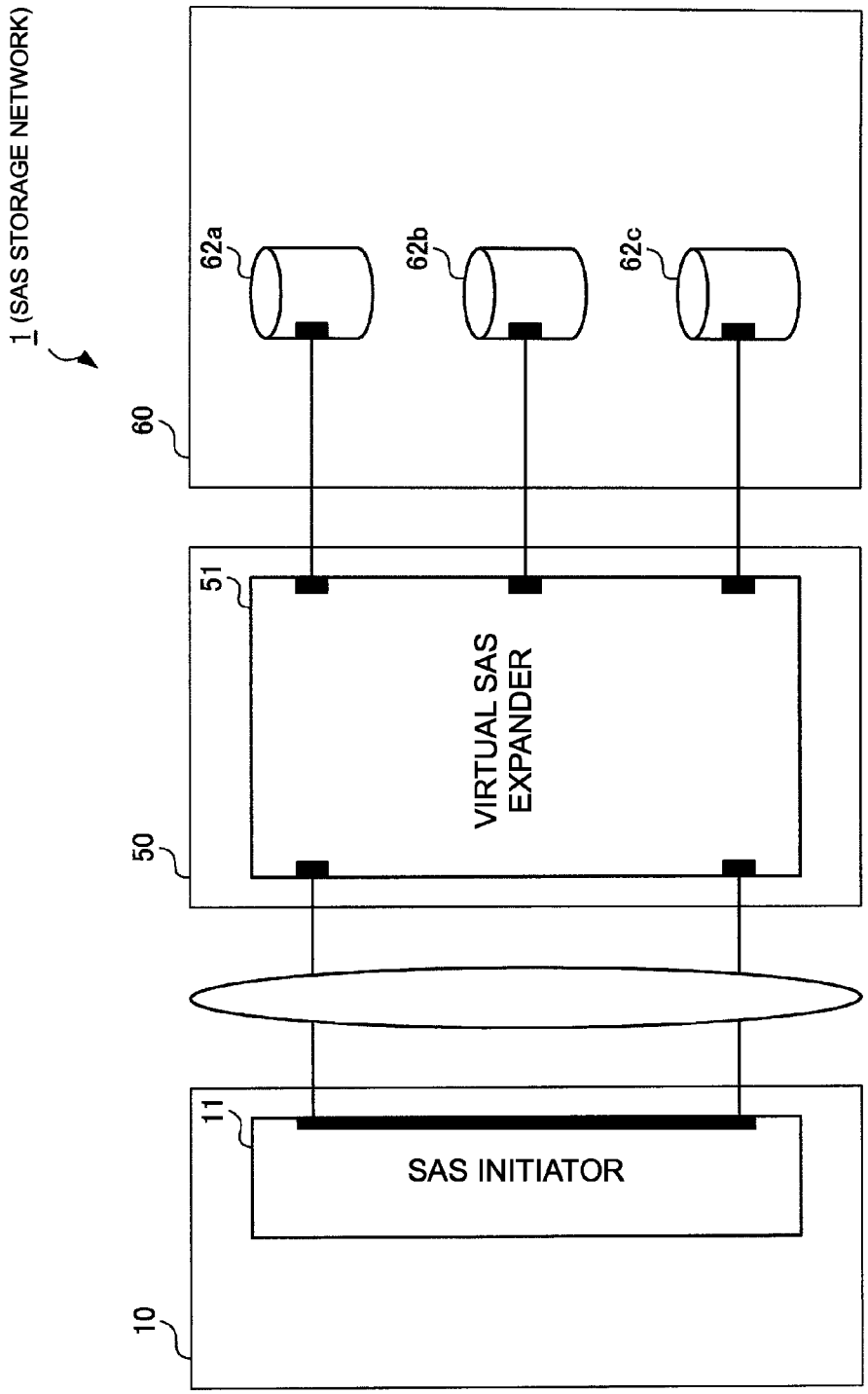
FIG. 6 is a diagram showing how the SAS host sees devices after the SAS expander in the embodiment of the present invention reports the virtual topology.

FIG. 6 shows how the SAS host 10 sees the devices as a result of the processes in FIGS. 4, 5-1, and 5-2.

The SAS host 10 has the same configuration including the unit serving as the SAS initiator 11 as the actual configuration shown in FIG. 1.

In contrast, the SAS switches 20a, 20b in FIG. 1 are recognized as a single SAS switch by the SAS host 10. FIG. 6 shows the single SAS switch as a virtual SAS switch 50. The SAS host 10 sees as if the two PHYs of the HBA thereof were connected to a single SAS expander. FIG. 6 shows the single SAS expander as a virtual SAS expander 51.

The SAS host 10 also sees as if SAS targets to be accessed were directly connected to a SAS expander. FIG. 6 shows the SAS targets as virtual SAS targets 62a, 62b, 62c (hereinafter, each referred to as a virtual SAS target 62 simply). FIG. 6 also shows a SAS storage subsystem as a virtual SAS storage subsystem 60 including the virtual SAS targets 62.

This makes it possible to establish multiple connections simultaneously and to achieve high performance.

In addition, this prevents a single device from being seen as multiple devices.

(3) Controlling Path by Converting SAS Address of Target Port

As described in (1) above, the SAS expander 21 has therein the target-port configuration table. The SAS expander 21 converts a virtual target port address into a real target port address and thereby performs routing.

Assume a case where the SAS initiator 11 accesses the SAS target 32a from a PHY on the link 41a side, for example. In this case, there are physically two paths from the SAS expander 21a to the SAS target 32a. One is a path via the link 42a (an example of the first path), and the other is a path via the bridge 43 and the link 42b (an example of the second path). However, suppose a case where one of the paths is always used and is switched to the other at a failure time. This means that any one of the paths is necessarily used from the SAS expander 21 to the SAS target 32. Thus, the one path might be a bottleneck.

Hence, in this embodiment, the alternative path in case of the failure is also utilized in the multipath configuration by the SAS expander 21. By routing the SAS traffic to the multiple paths from the SAS expander 21, the SAS traffic load distribution is achieved. Specifically, the SAS expander 21 utilizes data in an SSP transport layer which is normally not processed by the SAS expander and distributes SAS traffics evenly in the multiple paths.

In order to achieve this, the following functions are given to the SAS expanders 21a, 21b.

(A) (3-1) Function of analyzing a frame in the SSP transport layer (hereinafter, referred to as an "SSP frame")
(B) (3-2) Function of routing a SAS frame to multiple paths to distribute SAS traffic as evenly as possible This increases bands used for the SAS between the SAS host 10 and the SAS storage subsystem 30, and thus enhances the I/O performance from the SAS host 10 to the SAS storage subsystem 30. This also eliminates the need for a special HBA or a storage device. Further, this also eliminates the need for a multipath driver in the SAS host 10 for exclusive multiport control and load distribution.

Here, a description is given of an SSP.

The SSP is a protocol defined to transmit a SCSI protocol in the SAS.

The SSP frame includes an SSP command frame, an SSP transfer ready frame, an SSP data frame, an SSP task frame, and an SSP response frame.

The SSP command frame is a frame used to transmit a SCSI command from a SAS initiator to a SAS target. In particular, the SSP command frame includes a data length of data (hereinafter, referred to as a "requested data length") requested to be written or read by an SSP data frame to be transmitted subsequently.

The SSP transfer ready frame is a frame transmitted by the SAS target to request the SAS initiator for write data, when the SAS target determines to be ready for receiving data requested to be written by the SSP data frame, on the basis of the requested data length included in the SSP command frame.

The SSP data frame is a frame for transferring the write data from the SAS initiator to the SAS target and for transferring read data from the SAS target to the SAS initiator.

The SSP task frame is a frame used to transmit a task management function from the SAS initiator to the SAS target. Note that an example of the task management function is to abort or reset a command by the SSP command frame transmitted to the SAS target.

The SSP response frame is a frame for returning, from the SAS target to the SAS initiator, a result of processing of a command by the SSP command frame or of processing of a task by the SSP task frame after the processing is terminated. The result of the processing includes "GOOD," "CHECK CONDITION" and the like.

Meanwhile, the above functions (3-1) and (3-2) are implemented by a path determination unit 26 of the SAS expander 21.

Hence, a description is firstly given in detail of a functional configuration of the path determination unit 26.

Figure 7:
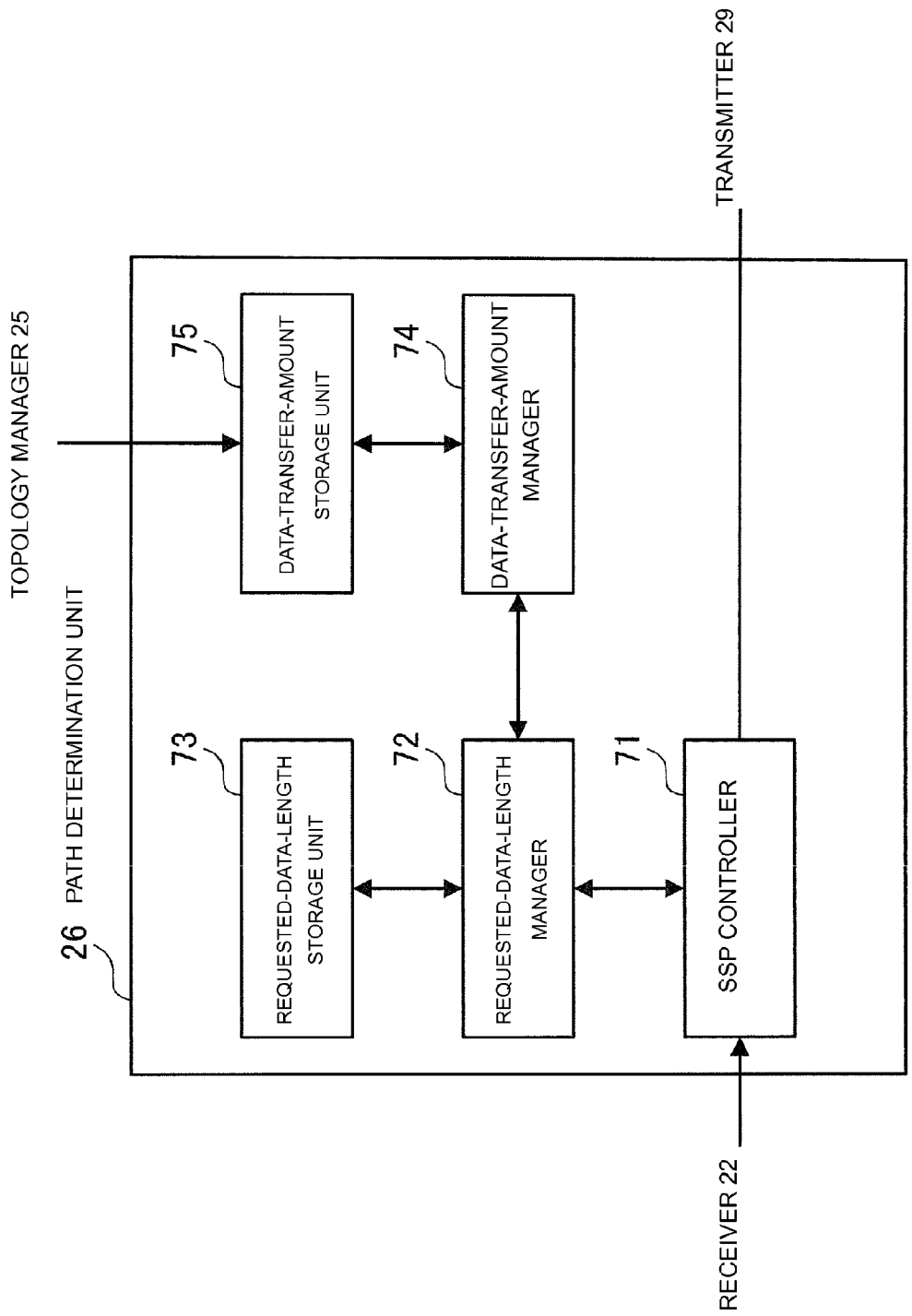
FIG. 7 is a block diagram showing a functional configuration example of a path determination unit of the SAS expander in the embodiment of the present invention.

FIG. 7 is a block diagram showing an example of a functional configuration of the path determination unit 26.

As illustrated, the path determination unit 26 includes an SSP controller 71, a requested-data-length manager 72, a requested-data-length storage unit 73, a data-transfer-amount manager 74, and a data-transfer-amount storage unit 75.

The SSP controller 71 extracts the SSP frame from a SAS frame received from the receiver 22 (see FIG. 2) and analyzes the SSP frame. Then, if the SSP frame is the SSP command frame, the SSP controller 71 controls a path determination operation and a data-transfer-amount adjustment operation by the requested-data-length manager 72 and the data-transfer-amount manager 74 and hands over the SAS frame and the determined path information to the transmitter 29 (see FIG. 2). If the SSP frame is the SSP response frame, the SSP controller 71 controls data-transfer-amount adjustment operations by the requested-data-length manager 72 and the data-transfer-amount manager 74 and hands over the SAS frame to the transmitter 29 (see FIG. 2). Alternatively, if the SSP frame is the SSP task frame, the SSP controller 71 may control the operations by the requested-data-length manager 72 and the data-transfer-amount manager 74.

The requested-data-length manager 72 manages information related to the SSP command frame, particularly, the requested data length in the SSP command frame and the path in which the SSP command frame should be transferred. Alternatively, the requested-data-length manager 72 may manage information related to the SSP task frame in addition to this. In this embodiment, the requested-data-length manager 72 is provided as an example of a holding unit configured to hold information indicating that the SSP command frame is received.

The requested-data-length storage unit 73 stores a table (hereinafter referred to as a "requested-data-length table" for storing information related to the SSP command frame managed by the requested-data-length manager 72. Alternatively, information related to the SSP task frame may be stored in the requested-data-length table.

The data-transfer-amount manager 74 manages a data transfer amount of each of paths to the SAS target 32, determines a path based on the data transfer amount, and performs addition or subtraction of the requested data length to or from the data transfer amount. In this embodiment, the data transfer amount is used as an example of a transmitted-received data amount which is an amount of data transmitted and received using the path, and the data-transfer-amount manager 74 is provided as an example of a determination unit configured to determine a particular path as a path to be used for transmission on the basis of the transmitted-received data. As an example of requested data amount which is an amount of data requested to be transmitted and received by the SSP command frame, the requested data length is used. As an example of an adding unit configured to add the requested data amount to the transmitted-received data and as an example of a subtracting unit configured to subtract the requested data amount from the transmitted-received data, the data-transfer-amount manager 74 is provided.

The data-transfer-amount storage unit 75 stores counters (hereinafter, referred to as "data-transfer-amount counters") associated with multiple paths indicating data transfer amounts managed by the data-transfer-amount manager 74. Note that the multiple path identifiers may be set based on information acquired in processing in FIG. 5-1 by the topology manager 25. In this embodiment, as an example of a storage unit configured to store a transmitted-received data amount, the data-transfer-amount storage unit 75 is provided.

FIG. 8 shows an example of the requested-data-length table stored in the requested-data-length storage unit 73.

As illustrated therein, the requested-data-length table includes a command identifier, a requested data length, and a path identifier as items thereof.

The command identifier is information for uniquely identifying an SSP command frame. Alternatively, the command identifier may include information for uniquely indentifying an SSP task frame.

The requested data length is the requested data length of an SSP command frame.

The path identifier is information for uniquely identifying a path used for transferring an SSP command frame.

FIG. 8 shows that, for example, an SSP command frame of a command identifier "cmd1" has a requested data length of L1 and is transferred to a path having a path identifier "pass1," and an SSP command frame of a command identifier "cmd2" has a requested data length of L2 and is transferred to a path having a path identifier "pass2."

Note that the table preferably has entries of which the number is larger than the depth of the queue of the storage devices.

Here, a description is given of the command identifier.

Generally in a SAS domain, SSP command frames, SSP data frames, and SSP response frames are transmitted asynchronously, and further, from multiple SAS initiators and SAS targets. Hence, a method for uniquely identifying an SSP command frame and an SSP task frame from an SSP response frame is defined for the SCSI protocol. I_T_L_Q nexus is the method and includes four values of an Initiator SAS address, a Target SAS address, a Logical Unit Number, and a Command Tag. If these four values match those in a frame, the frame is determined as a frame to which the SSP response frame responds.

Of the four values, the Initiator SAS address and the Target SAS address can firstly be acquired respectively from a Hashed Source SAS address field and a Hashed Destination SAS address field in the frame header of the SSP frame.

Next, the Command Tag corresponds to an Initiator Port Transfer Tag in the frame header of the SSP frame. In the Initiator Port Transfer Tag, a value unique on an I_T basis is set by the SAS initiator. In a case of the SSP command frame, the unique value is defined as a command identifier. In a case of the SSP task frame, the unique value is defined as an association. The values are unique on an I_T basis and must not overlap even between the SSP command frame and the SSP task frame. Even if a command is transmitted to SASs having the same I_T and different Logical Unit Numbers, the tag must not overlap.

Thus, if three values of the Initiator SAS address, the Target SAS address, and the Initiator Port Transfer Tag in the frame header of the SSP response frame or the SSP data frame are checked and if all of the three match those in an SSP command frame, the SSP command frame can be identified as one corresponding to the SSP response frame.

Hence, the command identifier in the requested-data-length table is constituted of at least the three values.

The SSP frame has an information unit following the frame header therein. The information unit has a field of the Logical Unit Number as a first field therein in the cases of the SSP command frame and the SSP task frame, although the field has a different format depending on the frame type. The Logical Unit Number field corresponds to L of I_T_L_Q nexus. In order to simply identify an SSP command frame or an SSP task frame corresponding to a received SSP response frame, only the above three values are required. However, in order to support an SSP task frame, the Logical Unit Number is also required.

FIG. 9 shows an example of data-transfer-amount counters stored in the data-transfer-amount storage unit 75.

As illustrated, the data-transfer-amount counters each include multiple path identifiers respectively associated with data transfer amounts.

FIG. 9 shows that data-transfer-amount counters of paths of path identifiers of "pass1" and "pass2" are T1 and T2, respectively.

Note that only two path identifiers are set for path data-transfer-amount counters in the SAS expander 21*a* in FIG. 9 by assuming the path via the link 42*a* and the path via the bridge 43 and the link 42*b*. However, path identifiers of unillustrated other paths (not limited to paths to the SAS target 32) may be set.

Next, a description is given of an operation of the SAS expander 21 in performing load distribution of the SAS traffic by using multiple paths.

Note that a SAS frame is transmitted and received asynchronously between the SAS initiator 11 and the SAS target 32. This means that the order of I/Os is not guaranteed on the SAS target 32 side. In order to execute I/Os in order, an application of the SAS host 10 transfers the first I/O command to the SAS target 32, receives a response to the command from the SAS target 32, and then transfers the second I/O command to the SAS target 32. Thus, the SAS expander 21 does not take into account the order of I/Os and performs I/Os to and from the SAS target 32 by using multiple paths in the following manner.

Specifically, the SAS expander 21 firstly receives a SAS frame in which a virtual target port address is set as a destination address. Then, the SAS expander 21 refers to the target-port configuration table stored in the table storage unit 23 and acquires at least one real target port address associated with the virtual target port address set as the destination address. For example, upon receipt of the SAS frame in which a virtual target port address D1 is set as a destination address, the SAS expander 21 refers to the target-port configuration table in FIG. 3 to acquire real target port addresses D1A and D1B.

Meanwhile, the SAS expander 21 holds a routing table (not shown) in which, as a result of the processing in FIG. 5-1, real target port addresses are associated with PHYs (associated with paths on a one-to-one basis) used for transferring data to the respective real target port addresses. Hence, the routing table is referred to by the receiver 22 and thereby a pass identifier of a path associated with the at least one real target port address previously acquired is determined as a path identifier candidate of a path via which the SAS frame should be transferred. For example, suppose that, in the SAS expander 21*a*, the path having the pass identifier "pass1" is a path via the link 42*a* and the path having the pass identifier "pass2" is a path via the bridge 43 and the link 42*b*. In this case, association between the real target port address D1A and the path identifier "pass1" and association between the real target port address D1B and the path identifier "pass2" are acquired from the routing table, and thus the path identifiers "pass1" and "pass2" are determined as path identifier candidates for a path via which the SAS frame should be transferred.

Next, the path determination unit 26 receives the SAS frame and the path identifier candidate from the receiver 22 and determines the path via which the SAS frame should be transferred. Note that the path determination unit 26 has two kinds of operations at this time: one is in a case of supporting an SSP command frame and not supporting an SSP task frame; and the other is in a case of supporting both the SSP command frame and the SSP task frame. Hence, a description is given in detail by taking the former as a first operation example and the latter as a second operation example.

First Operation Example

When the SSP controller 71 receives a SAS frame and a path identifier candidate from the receiver 22, the path determination unit 26 extracts an SSP frame from the SAS frame and judges a frame type field in the frame header of the SSP frame. If the judgment result shows that the SSP frame is an SSP command frame, the path determination unit 26 performs processing for SSP command frame reception. If the SSP frame is an SSP response frame, the path determination unit 26 performs processing for SSP response frame reception.

Firstly, a description is given of the processing for SSP command frame reception.

Figure 10:
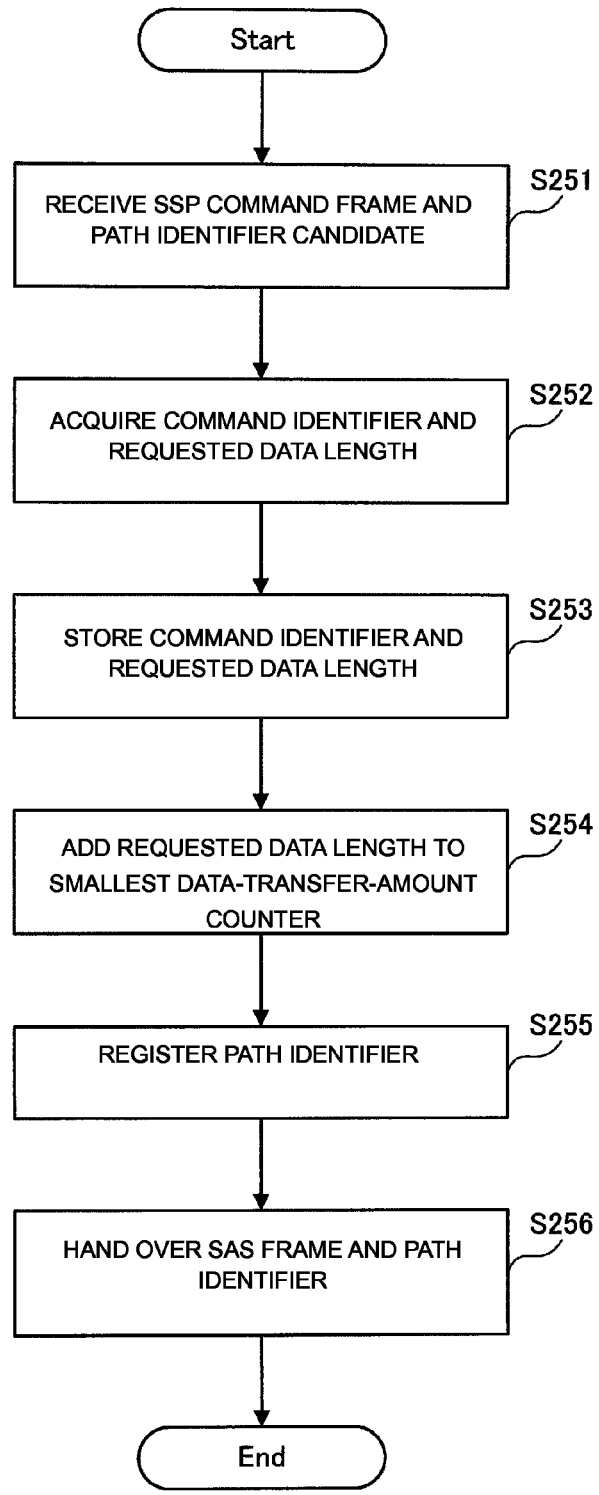
FIG. 10 is a flowchart showing an example of an operation of the path determination unit in the embodiment of the present invention at the time of receiving an SSP command frame in a first operation example.

FIG. 10 is a flowchart showing an operation example of the path determination unit 26 at this time.

In the path determination unit 26, the SSP controller 71 firstly receives the SSP command frame and the path identifier candidate (Step 251). Note that the SSP command frame and the path identifier candidate as well as control thereof are handed over to the requested-data-length manager 72.

Then, the requested-data-length manager 72 acquires, from the SSP command frame handed over from the SSP controller 71, a command identifier which is identification information for the SSP command frame and a requested data length of the SSP command frame (Step 252). At this time, the command identifier includes three values of an Initiator SAS address, a Target SAS address, and an Initiator Port Transfer Tag, as described above. Note that the Initiator SAS address, the Target SAS address, and the Initiator Port Transfer Tag can be acquired from the frame header of the SSP command frame. In addition, since concrete command detail such as read/write, the length of data to be a target of the command, and the like are designated in a block called a command description block (CDB) in the information unit of the SSP command frame, the requested data length is acquired from the block. Then, the requested-data-length manager 72 stores the command identifier and the requested data length in the requested-data-length table stored in the requested-data-length storage unit 73 (Step 253). Note that the requested data length and the path identifier candidate received in Step 251 as well as the control thereof are handed over to the data-transfer-amount manager 74.

Thereby, the data-transfer-amount manager 74 selects the smallest data-transfer-amount counter from at least one data-transfer-amount counter associated with the path identifier candidate handed over from the requested-data-length manager 72, among the data-transfer-amount counters stored in the data-transfer-amount storage unit 75. The data-transfer-amount manager 74 then adds the requested data length handed over from the requested-data-length manager 72 to the selected data-transfer-amount counter (Step 254). Note that the path identifier associated with the data-transfer-amount counter to which the requested data length is added is handed over to the requested-data-length manager 72, and the control thereof is returned to the requested-data-length manager 72.

Then, the requested-data-length manager 72 registers the path identifier handed over from the data-transfer-amount manager 74 with the command identifier and the requested data length which are stored in Step 253 (Step 255). Note that the registered path identifier is handed over to the SSP controller 71, and the control thereof is returned to the SSP controller 71.

Thereby, the SSP controller 71 hands over the SAS frame received from the receiver 22 and the path identifier received from the requested-data-length manager 72 to the transmitter 29 (Step 256).

Subsequently, the transmitter 29 refers to the routing table (not shown) and thereby acquires a real target port address associated with the path identifier handed over from the SSP controller 71. Then, the transmitter 29 changes the SAS address set as the destination address of the SAS frame to a real target port address thereof and transfers the SSP command frame.

Next, a description is given of the processing for SSP response frame reception.

Figure 11:
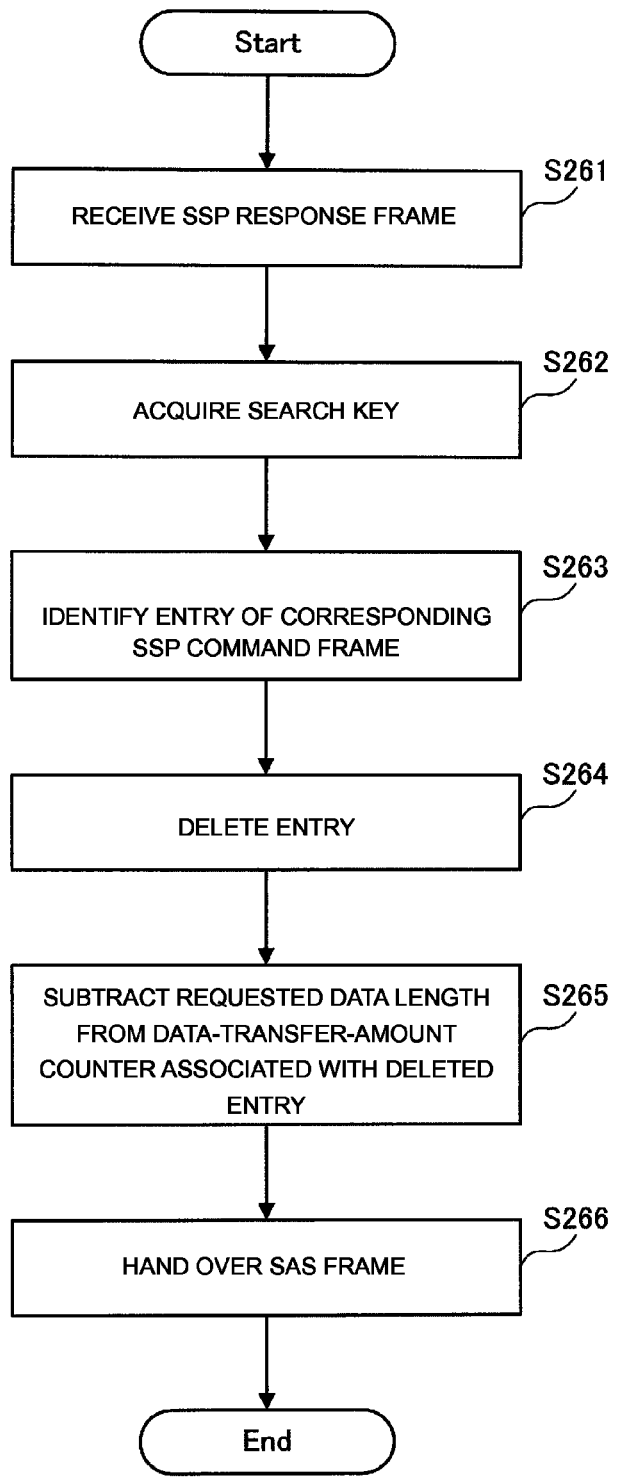
FIG. 11 is a flowchart showing an example of an operation of the path determination unit in the embodiment of the present invention at the time of receiving an SSP response frame in the first operation example.

FIG. 11 is a flowchart showing an operation example of the path determination unit 26 at this time.

In the path determination unit 26, the SSP controller 71 firstly receives the SSP response frame (Step 261). Note that the SSP response frame as well as control thereof is handed over to the requested-data-length manager 72.

Then, the requested-data-length manager 72 acquires a search key for searching the SSP response frame handed over from the SSP controller 71 for an SSP command frame corresponding to the SSP response frame (Step 262). Note that the search key includes the three values of the Initiator SAS address, the Target SAS address, and the Initiator Port Transfer Tag. The requested-data-length manager 72 searches the requested-data-length table stored in the requested-data-length storage unit 73 by using the search key to find an entry of the corresponding SSP command frame (Step 263). Specifically, the requested-data-length manager 72 determines an entry having a command identifier matching the search key in entries in the requested-data-length table as the entry of the corresponding SSP command frame. Then, the requested-data-length manager 72 deletes the entry (Step 264). Note that the requested data length and the path identifier in the deleted entry as well as the control thereof are handed over to the data-transfer-amount manager 74.

Thereby, the data-transfer-amount manager 74 subtracts the requested data length handed over from the requested-data-length manager 72 from the data-transfer-amount counter associated with the path identifier handed over from the requested-data-length manager 72, among the data-transfer-amount counters stored in the data-transfer-amount storage unit 75 (Step 265).

Then, the SSP controller 71 hands over the SAS frame received from the receiver 22 to the transmitter 29 (Step 266).

Then, the transmitter 29 transmits the SAS frame to the SAS initiator 11.

Meanwhile, when a command is aborted by the task management function, the SAS target 32 might not return an SSP response frame in response to the command. In such a case, like the first operation example, if the SAS expander 21 does not take into account an SSP task frame and an SSP response frame in response thereto, an entry of the aborted command might be left in the requested-data-length table.

Hence, in the first operation example, a time-out period is set for each entry when the SSP command frame is registered with the requested-data-length table. The requested-data-length table is regularly checked, and an entry expiring the time-out period is deleted. In addition, the requested data length in the deleted entry is subtracted from the data-transfer-amount counter associated with the path identifier in the deleted entry, among the data-transfer-amount counters. The method for setting such a time-out period is effective, because an unnecessary command entry in the requested-data-length table can be deleted, and the requested data length of the unnecessary command can be subtracted from the data-transfer-amount counter, even in such an error case that the SSP response frame is not returned, for example, in cases where the SAS target 32 falls into an abnormal state to be hanged, where the SAS target 32 is involuntarily reset, and the like.

It goes without saying that completely supporting the task management function by the SAS expander 21 as in the second operation example to be described later enables finer load distribution. However, it appears that the task management function does not occur so frequency, and thus the method for the first operation example is considered effective enough.

Second Operation Example

When the SSP controller 71 receives a SAS frame and a path identifier candidate from the receiver 22, the path determination unit 26 extracts an SSP frame from the SAS frame and judges a frame type field in the frame header of the SSP frame. If the judgment result shows that the SSP frame is an SSP command frame, the path determination unit 26 performs processing for SSP command frame reception. If the SSP frame is an SSP task frame, the path determination unit 26 performs processing for SSP task frame reception. If the SSP frame is an SSP response frame, the path determination unit 26 performs processing for SSP response frame reception.

An operation example of the path determination unit 26 at this time in the operation for SSP command frame reception is the substantially same as the first operation example, and thus a description thereof is omitted.

However, since the SSP command frame and the SSP task frame are processed together in the second operation example, the configuration of the command identifier is different from that in the first operation example. To put it differently, the command identifier includes values of an Initiator SAS address, a Target SAS address, an Initiator Port Transfer Tag, a Logical Unit Number, a flag for identifying whether the frame is for a command or a task (hereinafter, referred to as a command-or-task flag), a type of a command or a task management function, and a Tag of Task to be Managed. Specifically, the Initiator SAS address, the Target SAS address, the Initiator Port Transfer Tag, and the command-or-task flag can be acquired from the frame header of the SSP command frame. The Logical Unit Number and the command type can be acquired from the fields in the information unit of the SSP command frame. In contrast, no value is set as the Tag of Task to be Managed in this case, because the value is set only for the task management function.

Next, a description is given of the processing for SSP response frame reception.

Figure 12:
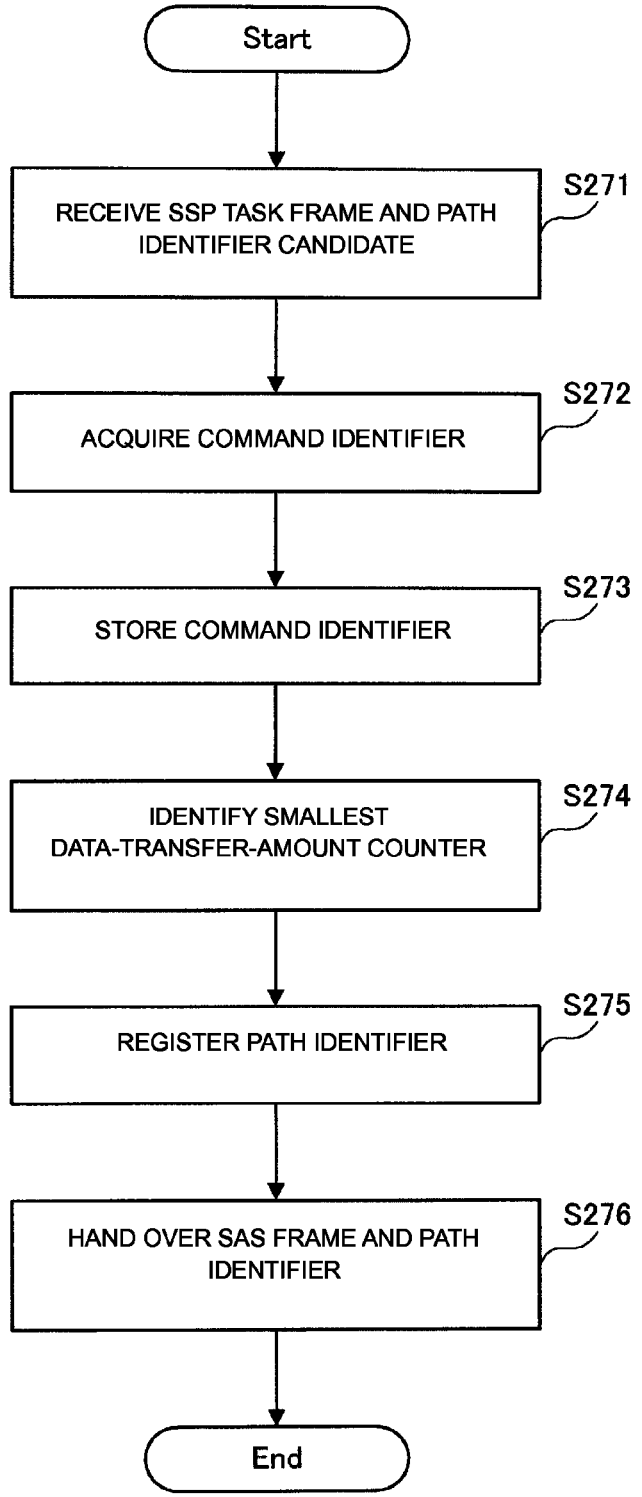
FIG. 12 is a flowchart showing an example of an operation of the path determination unit in the embodiment of the present invention at the time of receiving an SSP task frame in a second operation example.

FIG. 12 is a flowchart showing an operation example of the path determination unit 26 at this time.

In the path determination unit 26, the SSP controller 71 firstly receives the SSP task frame and the path identifier candidate (Step 271). Note that the SSP task frame and the path identifier candidate as well as control thereof are handed over to the requested-data-length manager 72.

Then, the requested-data-length manager 72 acquires, from the SSP command frame handed over from the SSP controller 71, a command identifier which is identification information for the SSP command frame and the SSP task frame (Step 272). At this time, the command identifier includes values of the Initiator SAS address, the Target SAS address, the Initiator Port Transfer Tag, the Logical Unit Number, the command-or-task flag, the type of a command or a task management function, and the Tag of Task to be Managed. Note that the Initiator SAS address, the Target SAS address, the Initiator Port Transfer Tag, and the command-or-task flag can be acquired from the frame header of the SSP task frame. The Logical Unit Number and the task management function type can be acquired from fields in the information unit of the SSP task frame. The Tag of Task to be Managed is used only for an ABORT TASK and a QUERY TASK and is information concretely designating which command should be processed. The Tag of Task to be Managed can be acquired from a field in the information unit of the SSP task frame. Then, the requested-data-length manager 72 stores the command identifier in the requested-data-length table stored in the requested-data-length storage unit 73 (Step 273). The path identifier candidate received in Step 271 as well as the control thereof is handed over to the data-transfer-amount manager 74.

Thereby, the data-transfer-amount manager 74 selects the smallest data-transfer-amount counter from at least one data-transfer-amount counter associated with the path identifier candidate handed over from the requested-data-length manager 72, among the data-transfer-amount counters stored in the data-transfer-amount storage unit 75 (Step 274). Note that the path identifier associated with the selected data-transfer-amount counter is handed over to the requested-data-length manager 72, and the control thereof is returned to the requested-data-length manager 72.

Then, the requested-data-length manager 72 registers the path identifier handed over from the data-transfer-amount manager 74 with the command identifier stored in Step 273 (Step 275). Note that the registered path identifier is handed over to the SSP controller 71, and the control thereof is returned to the SSP controller 71.

Thereby, the SSP controller 71 hands over the SAS frame received from the receiver 22 and the path identifier received from the requested-data-length manager 72 to the transmitter 29 (Step 276).

Subsequently, the transmitter 29 refers to the routing table (not shown) and thereby acquires a real target port address associated with the path identifier handed over from the SSP controller 71. Then, the transmitter 29 changes the SAS address set as the destination address of the SAS frame to a real target port address thereof and transfers the SSP task frame.

Next, a description is given of the processing for SSP response frame reception.

Figure 13:
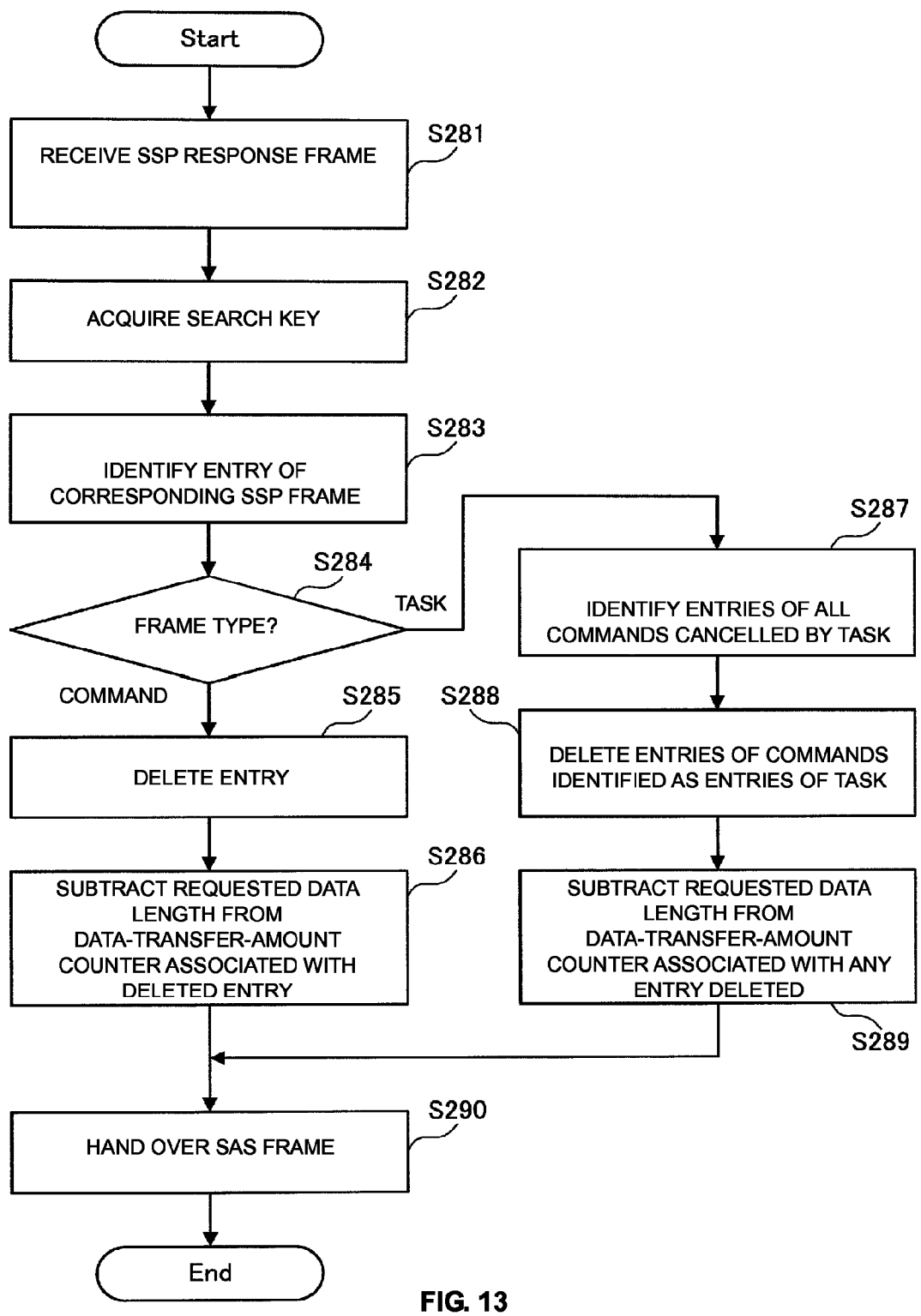
FIG. 13 is a flowchart showing an example of an operation of the path determination unit in the embodiment of the present invention at the time of receiving an SSP response frame in the second operation example.

FIG. 13 is a flowchart showing an operation example of the path determination unit 26 at this time.

In the path determination unit 26, the SSP controller 71 firstly receives the SSP response frame (Step 261). Note that the SSP response frame as well as control thereof is handed over to the requested-data-length manager 72.

Then, the requested-data-length manager 72 acquires a search key for searching the SSP response frame handed over from the SSP controller 71 for an SSP frame corresponding to the SSP response frame (Step 282). Note that the search key includes three values of the Initiator SAS address, the Target SAS address, and the Initiator Port Transfer Tag. The requested-data-length manager 72 searches the requested-data-length table stored in the requested-data-length storage unit 73 by using the search key to find an entry of the corresponding SSP frame (Step 283). Specifically, the requested-data-length manager 72 determines an entry having a command identifier that has values of the Initiator SAS address, the Target SAS address, and the Initiator Port Transfer Tag matching those of the search key, in entries in the requested-data-length table as the entry of the corresponding SSP frame. Then, the requested-data-length manager 72 judges whether the entry is an entry of an SSP command frame or an SSP task frame (Step 284). Note that the judgment can be made based on the command-or-task flag of the command identifier.

If the judgment result shows that the entry is judged as the entry of an SSP command frame, the requested-data-length manager 72 deletes the entry (Step 285). Note that the requested data length and the path identifier in the deleted entry as well as the control thereof are handed over to the data-transfer-amount manager 74.

Thereby, the data-transfer-amount manager 74 subtracts the requested data length handed over from the requested-data-length manager 72 from a data-transfer-amount counter associated with the path identifier handed over from the requested-data-length manager 72 among the data-transfer-amount counters stored in the data-transfer-amount storage unit 75 (Step 286).

On the other hand, if the entry is judged as the entry of an SSP task frame, the requested-data-length manager 72 finds the entries of all the commands cancelled by the SSP task frame (Step 287).

For example, suppose a case where the SSP task frame is for an ABORT TASK (a task for aborting a particular command). The task management function type in the command identifier indicates that the SSP task frame is for the ABORT TASK. In this case, the requested-data-length manager 72 searches the requested-data-length table for an entry which has an I_T matching an I_T in the SSP task frame and has an Initiator Port Transfer Tag matching a Tag of Task to be Managed in the SSP task frame. Note that the ABORT TASK cancels only one command.

Further, suppose a case where the SSP task frame is for an ABORT TASK SET (a task for aborting all the commands from an initiator). The task management function type in the command identifier indicates that the SSP task frame is for the ABORT TASK SET. In this case, the requested-data-length manager 72 searches the requested-data-length table to find all the entries having the I_T and the Logical Unit Number which match those in the SSP task frame.

Then, the requested-data-length manager 72 deletes the entry of the SSP task frame and the entries of all the commands found in Step 287 (Step 288). Note that the requested data length and the path identifier in the entry of each deleted command as well as the control thereof are handed over to the data-transfer-amount manager 74.

Thereby, the data-transfer-amount manager 74 subtracts the requested data length handed over from the requested-data-length manager 72 from a data-transfer-amount counter associated with the path identifier handed over from the requested-data-length manager 72 among the data-transfer-amount counters stored in the data-transfer-amount storage unit 75 (Step 289).

Then, the SSP controller 71 hands over the SAS frame received from the receiver 22 to the transmitter 29 (Step 290).

Subsequently, the transmitter 29 transmits the SAS frame to the SAS initiator 11.

As described above, in this embodiment, the SAS expander 21 is given the aforementioned functions (1) to (3), particularly the aforementioned functions (3-1) and (3-2) as the function (3).

This makes it possible to control the multipath on the switch and storage subsystem sides in the SAS domain and makes it possible for the SAS expander 21 to evenly distribute the SAS traffic via multiple paths. Consequently, the load distribution using the multipath is made possible without installing the multipath driver on the SAS host 10.

Note that the SSP data frame may be checked to reflect an amount of transferred data on a corresponding data-transfer-amount counter every time the data is transferred, although a description thereof has been omitted for simplicity in this embodiment. This enables finer load distribution.

Meanwhile, this embodiment is based on the configuration in which the SAS expanders 21a, 21b notify the SAS initiator 11 of the single virtual expander address, and thereby the SAS initiator 11 recognizes that the SAS initiator 11 is connected to the single virtual SAS expander 51. However, the embodiment is not necessarily based on such a configuration. That is, the embodiment may be based on a configuration in which the SAS initiator 11 is connected to an actually single SAS expander 21.

Note that this embodiment is applicable to multiple SAS hosts 10 and multiple SAS targets 32. Furthermore, this embodiment is applicable even to a multipath configuration built up by using one SAS expander or three or more SAS expanders.

Here, the present invention may be implemented entirely by hardware or entirely by software. Moreover, the present invention can alternatively be implemented by both hardware and software. Furthermore, the present invention can be implemented as a computer, a data processing system or a computer program. This computer program can be provided by being stored in a computer-readable medium. Here, conceivable medium are electronic, magnetic, optical, electromagnetic, infrared, and semiconductor systems (devices or equipment) as well as a propagation medium. Moreover, examples of the computer-readable medium are a semiconductor and solid-state storage device, a magnetic tape, a removable computer diskette, a random access memory (RAM), a read only memory (ROM), a rigid magnetic disc and an optical disc. Examples of the current optical disk include a compact disc read-only memory (CD-ROM), a compact disc-rewritable (CD-R/W) and a DVD.

The present invention has been described by using the above-described embodiment. However, the technical scope of the present invention is not limited to the embodiment. It is apparent to those skilled in the art that various changes can be made in the embodiment and alternative embodiments can be employed without departing from the spirit and scope of the present invention.

The present invention enables load distribution using a multipath in a SAS network.

What is claimed is:

1. A method for using a multipath in a device functioning as a Serial Attached SCSI (SAS) expander configured to connect a SAS initiator and a SAS target, wherein the method comprises the steps of:
   storing for each of a plurality of paths to the SAS target, a data transfer amount, wherein the data transfer amount is an amount of data transferred between the SAS initiator and the SAS target through said path;
   receiving a Serial SCSI Protocol (SSP) command frame from the SAS initiator, wherein the SSP command frame includes a data length amount for data requested to be transferred between the SAS initiator and the SAS target;
   upon receipt of the SSP command frame, selecting one path from the plurality of paths to the SAS target to satisfy the SSP command frame and achieve load distribution;
   adding the data length amount to the data transfer amount for the selected path;
   transmitting the SSP command frame to the SAS target through the selected path;
   receiving an SSP response frame responding to the SSP command frame from the SAS target;
   upon receipt of the SSP response frame, subtracting the data length amount from the data transfer amount for the selected path; and
   transmitting the SSP response frame to the SAS initiator.

2. The method of claim 1, wherein the selected path is the path to the SAS target with the smallest data transfer amount.

3. A method comprising:
   storing for each of a plurality of paths to a Serial Attached SCSI (SAS) target, a data transfer amount;
   receiving a Serial SCSI Protocol (SSP) command frame from the SAS initiator;
   upon receipt of the SSP command frame, selecting one path from the plurality of paths to the SAS target to satisfy the SSP command frame and achieve load distribution;
   adding the data length amount to the data transfer amount for the selected path;
   transmitting the SSP command frame to the SAS target through the selected path;
   upon receipt of A SSP response frame to the SSP command frame, subtracting the data length amount from the data transfer amount for the selected path; and
   transmitting the SSP response frame to the SAS initiator.

4. The method of claim 3, wherein the data transfer amount is an amount of data transferred between an SAS initiator and the SAS target through said path.

5. The method of claim 4, wherein the SSP command frame includes a data length amount for data requested to be transferred between the SAS initiator and the SAS target.

6. The method of claim 3, wherein the plurality of paths are from a device functioning as a SAS expander configured for connecting the SAS initiator and the SAS target.

7. The method of claim 6, wherein the selected path is the path to the SAS target with the smallest data transfer amount.

8. The method of claim 7, further comprising:
   the SAS expander:
      receiving a SSP task frame corresponding to the SSP command frame from the SAS initiator; and
      receiving a SSP response frame from the SAS target, wherein the SSP response frame corresponds to one of the following: the SSP command frame, and the SSP task frame;
      transmitting the SSP response frame to the SAS initiator; and
      transferring the data requested between the SAS initiator and the SAS target on the selected path.

9. The method of claim 8, wherein the subtracting further comprises subtracting the data length amount from the data transfer amount for the selected path after an elapse of a predetermined time, and subtracting the data length amount from the data transfer amount for the selected path when the SSP response frame is received by the SAS expander.

* * * * *